C. F. DUKE & P. F. WRIGHT.
GEARING.
APPLICATION FILED NOV. 27, 1911.
1,179,352.
Patented Apr. 11, 1916.
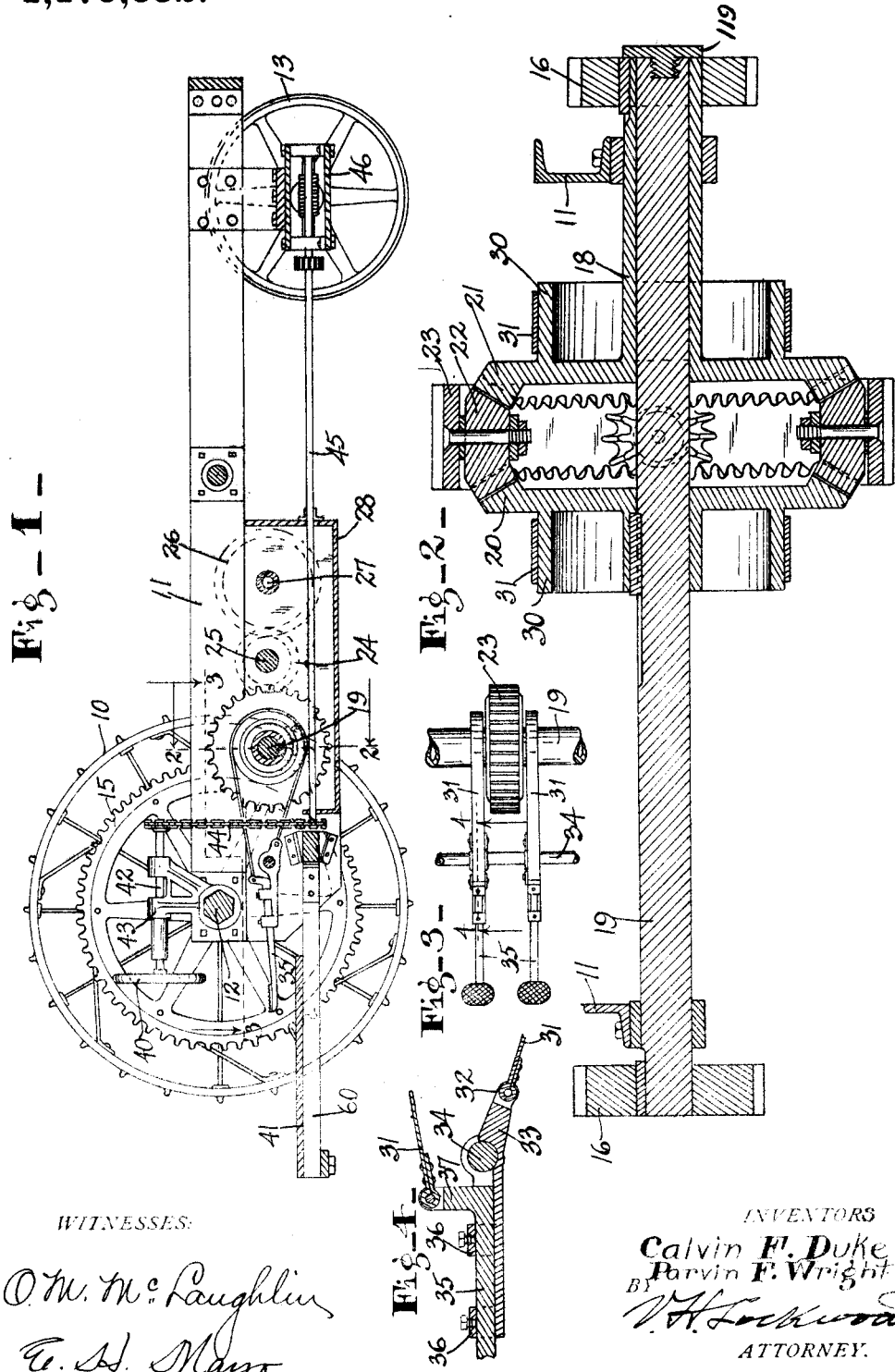
WITNESSES:
O. M. McLaughlin
E. A. Mayo
INVENTORS
Calvin F. Duke
Parvin F. Wright
BY
V. H. Lockwood
ATTORNEY.

UNITED STATES PATENT OFFICE.

CALVIN F. DUKE AND PARVIN F. WRIGHT, OF INDIANAPOLIS, INDIANA.

GEARING.

1,179,352.        Specification of Letters Patent.        Patented Apr. 11, 1916.

Application filed November 27, 1911. Serial No. 662,690.

*To all whom it may concern:*

Be it known that we, CALVIN F. DUKE and PARVIN F. WRIGHT, citizens of the United States, and residents of Indianapolis, county of Marion, and State of Indiana, have invented a certain useful Gearing; and we do hereby declare that the following is a full, clear, and exact description thereof, reference being had to the accompanying drawings.

The object of this invention is to improve the construction of tractors and automobiles with particular reference to the brake mechanism, and combinations of the brake mechanism and the steering mechanism so as to facilitate the turning of the vehicle and particularly to enable it to make an exceeding short turn.

The invention is of peculiar value in tractors used on the farm where short turning is often desired.

The chief feature of the invention consists of combining with the steering wheels of the vehicle, brake mechanism for braking either of the drive wheels so that by braking the side driving wheel on a turn, a very short turn could be accomplished.

Along with the foregoing is the further invention of the differential gearing arranged so that when one of the driving wheels is turned off by the brake the other driving wheel is actuated with double speed and double power as compared with the normal straightforward movement of the vehicle. This still further contributes toward making quick and short turns, particularly with heavy tractors, in fact the tractor can turn without any material change of position of the side drive wheel.

The nature of the invention will be understood from the accompanying drawings and the following description of the claims.

In the drawings Figure 1 is a central vertical section through a tractor equipped with our invention, the engine and other parts being omitted. Fig. 2 is a vertical transverse section on the line 2—2 of Fig. 1. Fig. 3 is a horizontal section on line 3—3 of Fig. 1. Fig. 4 is a vertical section on line 4—4 of Fig. 3.

The vehicle is provided with a pair of driving wheels 10, one on each side of the frame 11 and on each end of the axle 12. There may be one front steering wheel 13 or two of them as contemplated in the drawings herein. It is immaterial whether the drive wheels 10 are at the front or rear of the vehicle frame, but in any arrangement the steering wheel or wheels are at the end of the frame and remote from the driving wheels 10.

Each of the drive wheels 10 has a spur gear 15 with which a pinion 16 meshes within the driving wheel. The right hand pinion 16, as seen in Fig. 2, is secured to the tubular shaft 18, which surrounds and operates on the rod or shaft 19. The left hand pinion 16, same figure, is secured on the shaft 19 which has the gear 20 secured thereon. The sleeve 18 is mounted in a bearing, not shown, secured to the underside of the said bars of the frame so that its outer ends project laterally beyond the frame to the wheel. Endwise movement of the shaft 18 on the shaft 19 is prevented by the collar 119 secured to the end of the shaft 19.

Beveled gears 20 and 21 are respectively secured on the inner end of the sleeves 18 and on the shaft 19 and preferably integral therewith and face each other a sufficient distance apart to allow the beveled pinions 22 which project inwardly from the driving gear 23 to mesh with them as shown. The driving gear 23 is driven from any suitable source of power, there being shown in Fig. 1 an intermediate gear 24 meshing therewith and carried on a shaft 25 and said gear 24 meshing with a gear 26 on a shaft 27 which is driven by the engine, not shown. These parts are mounted on a box or casing 28 secured to the under side of the frame of the machine.

Each beveled gear 20 or 21 is provided with a brake cylinder 30 secured integrally therewith and projecting outwardly therefrom and over which a brake band 31 passes. There is a brake band for each brake cylinder and said band at one end is secured at 32 to a lever 33 fulcrumed on rod 34 extending transversely of the machine. The pedal bar 35 is adjustably secured to the lever 33 by bolts and nuts 36 and said pedal bar at its inner end has an upward extending portion 37 to which the other end of the brake band 31 is secured. The two pedal bars are placed side by side, as shown in Fig. 3, and preferably under a steering wheel 40 and over the platform 41 on which the operator stands. When the pedal bar 35 is depressed the band 31 will be tightened on the cylinder 30 and stop it and the beveled gear 20 or 21 attached thereto from rotation.

The steering wheel 40 is secured on a longitudinal shaft 42 mounted in the upper end of the frame 43 secured on the axle 12. At its inner end it carries a sprocket wheel which drives the chain 44 and extends down to a sprocket wheel for oscillating the steering shaft 45 and controlling the front wheels. The sort of steering apparatus is immaterial, as any other steering mechanism can be used, but with what is herein shown and described the steering wheel should be located in proximity with the pedal bars which control the brake mechanism.

If one desires to turn the vehicle to the left he operates his steering mechanism for that purpose and actuates the left hand pedal bar of the brake mechanism. This holds gear 20 stationary and, therefore, it does not drive the left hand drive wheel 10. That enables the vehicle to turn with said left hand drive wheel 10 as practically a center. When the gear 20 is held to the brake the beveled pinion 22 on wheel 23 will give double speed to the other beveled gear 21, and also practically double power as all the power transmitted will practically go to the wheel 21 and thus the right hand drive wheel 10 will be driven at greater speed and with greater power than normally. Of course, the brake band 31 will slip enough to allow the parts to accommodate themselves under strain, as is the case when the steering wheels are arranging so as to be given a sharp enough turn to wheel the vehicle around on one rear wheel as a center and the inside wheel will travel somewhat in making the turn. If the machine is to be turned to the right the other brake pedal is actuated and the opposite results will follow so far as the wheels 20 and 21 and driving wheels 10 are concerned. The platform 41 is mounted near its inner end to and between the plates 60 which are fastened to the frame.

We claim as our invention:

1. Gearing including an annular gear, beveled pinions mounted within said gearing, beveled gears meshing with the opposite sides of said pinions, means for braking each beveled gear, and power transmitting means connected with each beveled gear, whereby the speed of one of said beveled gears will be increased or diminished in proportion to the application or release of the means for braking the other beveled gear, substantially as set forth.

2. Gearing including an annular driving gear, radially projecting spindles secured within said gearing, beveled pinions on said spindles, beveled gears meshing with the opposite sides of said pinions, a shaft on which each beveled gear is secured, and braking means for each beveled gear and its shaft, substantially as and for the purpose set forth.

In witness whereof, we have hereunto affixed our signatures in the presence of the witnesses herein named.

CALVIN F. DUKE.
PARVIN F. WRIGHT.

Witnesses:
G. H. BOINK,
E. H. MAYO.